US008644831B2

(12) United States Patent
Bae et al.

(10) Patent No.: US 8,644,831 B2
(45) Date of Patent: Feb. 4, 2014

(54) REDIRECTION METHOD OF FEMTO CELL AND COMMUNICATION SYSTEM BASED THEREON

(75) Inventors: Eun Hui Bae, Seoul (KR); Chae Gwon Lim, Seoul (KR); Sung Ho Choi, Suwon-si (KR); Tae Sun Yeoum, Seoul (KR)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 12/692,278

(22) Filed: Jan. 22, 2010

(65) Prior Publication Data

US 2010/0210267 A1    Aug. 19, 2010

(30) Foreign Application Priority Data

Jan. 22, 2009  (KR) .................. 10-2009-0005300

(51) Int. Cl.
*H04W 36/00* (2009.01)
*H04W 4/00* (2009.01)
*H04W 72/00* (2009.01)
*H04B 1/38* (2006.01)

(52) U.S. Cl.
USPC ......... 455/436; 455/435.1; 455/453; 455/560

(58) Field of Classification Search
USPC ....................................................... 455/436
See application file for complete search history.

(56) References Cited

U.S. PATENT DOCUMENTS

| 2001/0012778 | A1* | 8/2001 | Eriksson et al. | 455/436 |
| 2002/0143956 | A1* | 10/2002 | Tanimoto | 709/227 |
| 2004/0176094 | A1* | 9/2004 | Kim et al. | 455/438 |
| 2004/0266474 | A1* | 12/2004 | Petrus | 455/525 |
| 2005/0030958 | A1* | 2/2005 | Laiho et al. | 370/401 |
| 2005/0176440 | A1* | 8/2005 | Sang et al. | 455/453 |
| 2006/0268765 | A1* | 11/2006 | Bajic et al. | 370/328 |
| 2007/0032237 | A1* | 2/2007 | Chang et al. | 455/436 |
| 2007/0097983 | A1* | 5/2007 | Nylander et al. | 370/395.2 |
| 2007/0249291 | A1* | 10/2007 | Nanda et al. | 455/73 |
| 2009/0073969 | A1* | 3/2009 | Gobara et al. | 370/389 |
| 2009/0131050 | A1* | 5/2009 | Osborn | 455/435.1 |
| 2009/0156213 | A1* | 6/2009 | Spinelli et al. | 455/436 |

* cited by examiner

*Primary Examiner* — Lester Kincaid
*Assistant Examiner* — Andy Gu
(74) *Attorney, Agent, or Firm* — The Farrell Law Firm, P.C.

(57) ABSTRACT

A redirection method of a femto cell is provided together with a communication system based thereon. A serving gateway, connected with a specific femto cell, or an additional server determines whether there is a need for a redirection of the femto cell by using a load condition of the serving gateway or a target gateway. If the redirection is determined, the femto cell receives redirection instructions from the serving gateway to the target gateway and then the redirection is performed. Since the femto cell is redirected from the overloaded femto gateway to another femto gateway, the femto cell can continuously provide a communication service to user terminals.

14 Claims, 5 Drawing Sheets

REDIRECTION METHOD OF FEMTO CELL AND COMMUNICATION SYSTEM BASED THEREON

PRIORITY

This application claims priority to an application entitled "REDIRECTION METHOD OF FEMTO CELL AND COMMUNICATION SYSTEM BASED THEREON" filed in the Korean Intellectual Property Office on Jan. 22, 2009 and assigned Serial No. 10-2009-0005300, the contents of which are incorporated herein by reference.

BACKGROUND OF THE INVENTION

1. Field of the Invention

The present invention relates in general to communication technology based on femto cells and, more particularly, to a redirection method of a femto cell and a communication system based thereon.

2. Description of the Related Art

A femto cell, also referred to as Home Node B (HNB), is a small cellular base station designed for use in residential or small business environments. A femto cell allows service providers to extend service coverage inside a home, especially where access would otherwise be limited or unavailable, without a need for expensive cellular towers. It also decreases backhaul costs since it routes mobile phone traffic through an IP network.

In a communication system based on such femto cells, femto gateways are generally installed between a femto cell and a core network. The femto gateway serves as a communication medium between the femto cell and the core network and thereby can disperse a load of the core network. Normally, each individual femto gateway may be connected with a number of femto cells, so that an overload may unfavorably happen in one or more of the femto gateways.

The operation performance of the femto gateway may decrease when the femto cells connected thereto or user terminals accessed to each femto cell increase in number. Also, poor efficiency of hardware in the femto gateway, an unfavorable communication environment between the femto cell and the femto gateway, or between the femto gateway and the core network may also invite a drop in operation performance of the femto gateway. In such circumstances the femto gateway may often fail to provide a reliable communication between the core network and the femto cell.

BRIEF SUMMARY OF THE INVENTION

Accordingly, an aspect of the present invention is to address the above-mentioned problems and/or disadvantages and to provide at least the advantages described below.

Aspects of the present invention are to provide a redirection method of a femto cell and a communication system based thereon.

According to one aspect of the present invention, a redirection method of a femto cell in a communication system based on the femto cells is provided. The method includes at a server, setting a femto cell identifier and address information of the femto cell; at the server, determining whether there is a need for a redirection of the femto cell by depending on a load condition of a serving gateway connected with the femto cell when the femto cell receives the load condition; if the redirection is determined, at the server, selecting one of target gateways by using the femto cell identifier and the address information, and transmitting redirection instructions toward the selected target gateway to the femto cell; and at the femto cell, receiving the redirection instructions and performing the redirection from the serving gateway to the selected target gateway.

According to another aspect of the present invention, a redirection method of a femto cell in a communication system based on the femto cells is provided. The method includes at a serving gateway, storing a femto cell identifier and address information of the femto cell when connected with the femto cell; at the serving gateway, determining whether there is a need for a redirection of the femto cell by using a load condition of a target gateway, the femto cell identifier and the address information when the serving gateway receives the load condition; if the redirection is determined, at the serving gateway, transmitting a redirection request to the target gateway and transmitting redirection instructions toward the target gateway to the femto cell; and at the femto cell, receiving the redirection instructions and performing the redirection from the serving gateway to the target gateway.

According to still another aspect of the present invention, provided is a communication system based on femto cells is provided. The system includes a serving gateway connected with the femto cell and configured to transmit a load condition thereof through the femto cell; a target gateway connected with the femto cell when a redirection of the femto cell is determined; and a server configured to set a femto cell identifier and address information of the femto cell, to determine whether there is a need for the redirection by depending on the load condition when the femto cell receives the load condition, to select the target gateway by using the femto cell identifier and the address information when the redirection is determined, and to transmit redirection instructions toward the target gateway to the femto cell.

According to yet another aspect of the present invention, provided is a communication system based on femto cells is provided. The system includes a serving gateway is configured to store a femto cell identifier and address information of the femto cell when connected with the femto cell; and a target gateway configured to transmit a load condition thereof, wherein the serving gateway is further configured to receive the load condition, to determine whether there is a need for a redirection of the femto cell by using the load condition, the femto cell identifier and the address information, to transmit a redirection request to the target gateway if the redirection is determined, to transmit redirection instructions toward the target gateway to the femto cell, and to release a connection with the femto cell.

Aspects of the present invention can allow, when an overload occurs in a certain femto gateway, a redirection of the femto cell from the overloaded femto gateway to another femto gateway. It is therefore possible for the femto cell to continuously provide a communication service to user terminals. Also, this communication system may improve and enhance a load balance between the femto gateways, the operation performance of the femto gateways, and service efficiency.

BRIEF DESCRIPTION OF THE DRAWINGS

Other aspects, advantages, and salient features of the invention will become apparent to those skilled in the art from the following detailed description, taken in conjunction with the accompanying drawings, in which.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Communication System Based on Femto Cells

Figure 1:
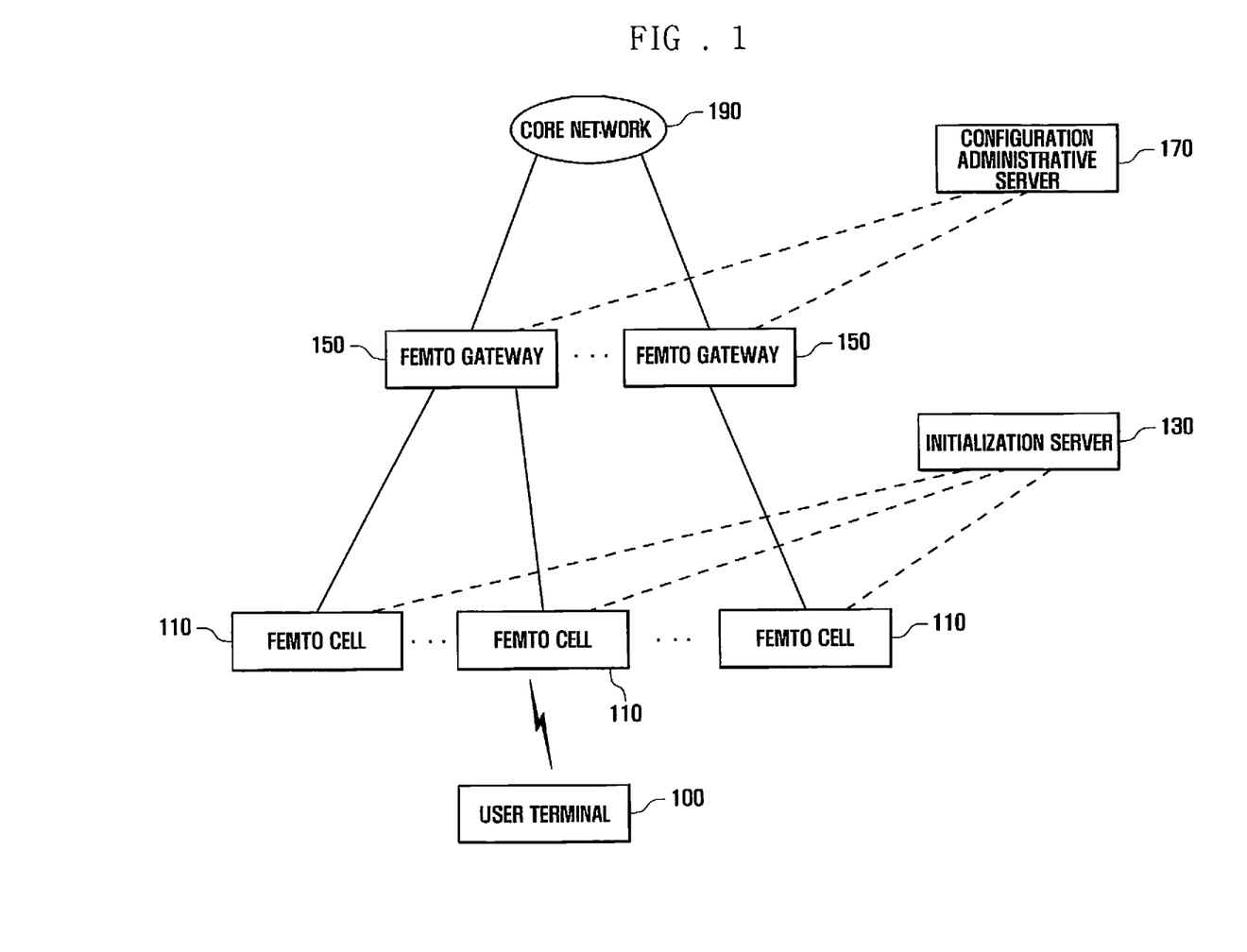
FIG. 1 is a block diagram which illustrates a configuration of a communication system based on femto cells in accordance with an embodiment of the present invention.

FIG. 1 is a block diagram which illustrates a configuration of a communication system based on femto cells in accordance with an embodiment of the present invention. This communication system may be realized using a variety of communication technologies such as Wideband Code Division Multiple Access (WCDMA), Global System for Mobile telecommunication (GSM), Code Division Multiple Access 2000 1x EVolution Data Optimized (CDMA2000 1x EVDO), and Long Term Evolution (LTE).

Referring to FIG. 1, the communication system includes a plurality of femto cells 110, at least one initialization server 130, a plurality of femto gateways 150, at least one configuration administrative server 170, and a core network 190.

The respective femto cells 110 control their own service area and communicate with user terminals 100 located therein. The user terminal 100 is a subscriber registered and specified in the femto cell 110. Each individual femto cell 110 communicates with given numbers of terminals 100 limitedly registered in advance. Furthermore, each femto cell 110 stores a user identifier, authentication information, and context information about each terminal 100.

Additionally, when being manufactured, each femto cell 110 may store hardware information, authentication information, address information, manufacturer information, etc. The femto cell 110 may obtain address information by detecting the current location through a search for neighboring macro femto cells. If having a global positioning service (GPS) receiving function, the femto cell 110 may detect the current location from GPS signals in order to obtain address information. Each individual femto cell may operate as independent equipment for controlling a predetermined area, and may be a home gateway for communication between an in-home cell and the femto gateway.

The initialization server 130 provides initial setting information required for installation of the femto cell 110. That is, when being installed, the femto cell 110 may send an initial setting request to the initialization server 130 by using hardware information, authentication information, address information, manufacturer information, etc. Then the initialization server 130 may perform authentication and offer initial setting information to the femto cell 110. Here, initial setting information may include a femto cell identifier used to identify a specific femto cell, a gateway list used to define at least one femto gateway accessible to a specific femto cell, frequency allocation information used for a specific femto cell, a pseudo noise code used to define a service area of a specific femto cell, a neighbor list used to define other femto cells adjacent to a specific femto cell, etc.

Each individual femto gateway 150 is connected with at least one femto cell 110 and further connected with the core network 190 in order to perform an individual communication. That is, the femto gateway 150 serves as a communication medium between the femto cell 110 and the core network 190. Particularly, according to the present invention, the femto cell 110 may perform a redirection between the femto cells 110. In this invention, the femto gateway 150 includes a serving gateway to which a specific femto cell is accessed, and a target gateway which is adopted as a target of a redirection by the specific femto cell.

The femto gateway 150 may store femto cell identifiers, address information, authentication information, manufacturer information, etc. of the respective femto cells 110 connected thereto. Also, the femto gateway 150 may store user identifiers, authentication information, context information, etc. of the respective user terminals 100 connected to each of the femto cells 110. Additionally, each of the femto gateways 150 checks the load condition depending on operation performance and shares the load condition jointly with other gateways.

The configuration administrative server 170 administers configurations of the femto gateways 150. The configuration of the femto gateway 150 includes a gateway identifier used to identify a specific femto gateway 150, a femto cell identifier used to identify a specific femto cell 110 connected to each femto gateway 150, etc.

The core network 190 is connected and communicates with the respective femto gateways 150. In addition, the core network 190 serves as a communication medium between its own communication system and other external communication networks.

First Embodiment of Redirection Method of Femto Cell

Figure 2:
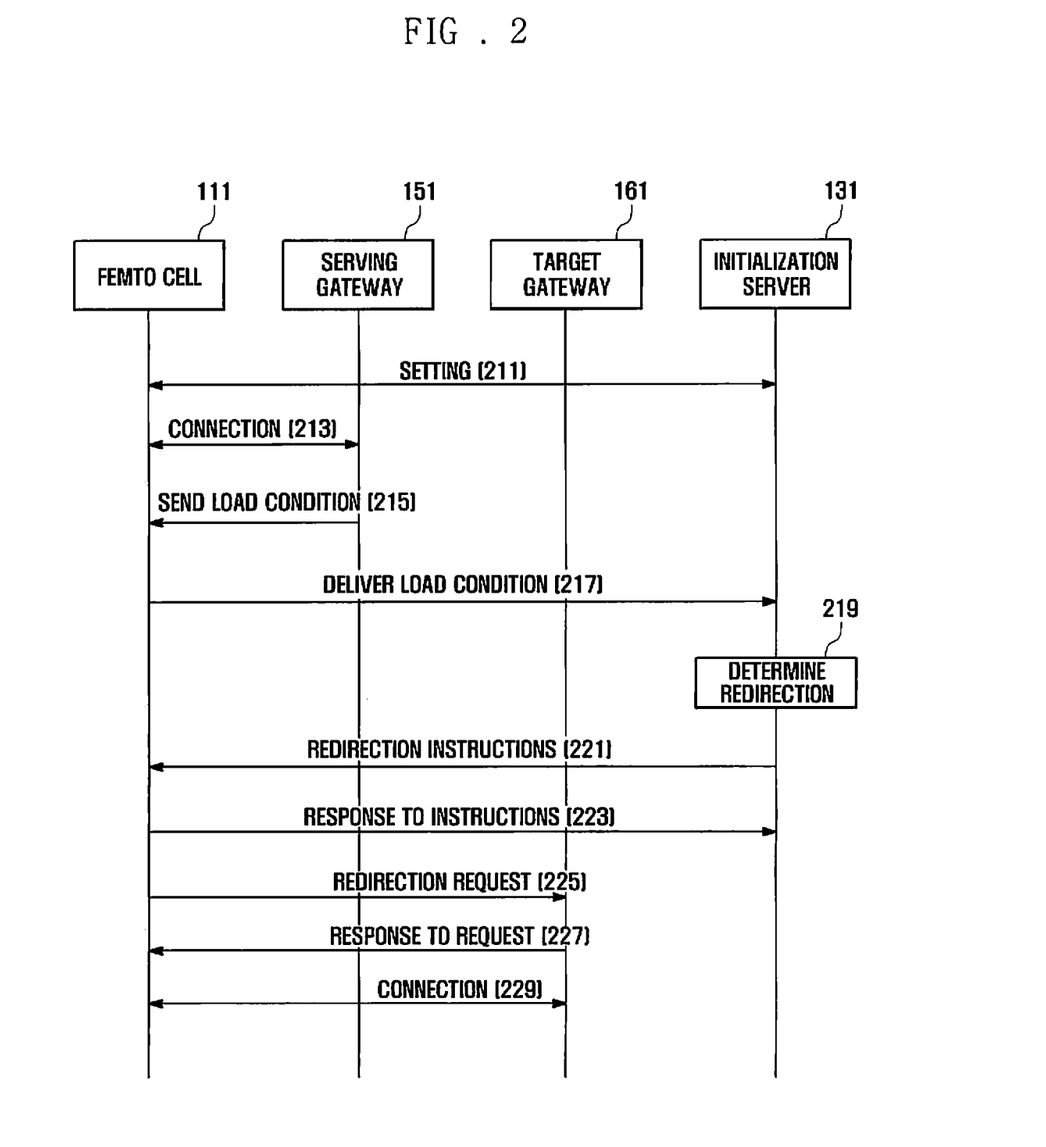
FIG. 2 is a flow diagram which illustrates a redirection method of a femto cell in accordance with a first embodiment of the present invention.

FIG. 2 is a flow diagram which illustrates a redirection method of a femto cell in accordance with the first embodiment of the present invention. Here, a femto cell 111 is a specific one of the aforementioned femto cells 110, and an initialization server 131 corresponds to the aforementioned initialization server 130. In addition, a serving gateway 151 and a target gateway 161 are specific ones of the aforementioned femto gateways 150.

Referring to FIG. 2, the redirection method of the femto cell 111 in this embodiment begins with an initial setting of the femto cell 111 through the initialization server 131 at step 211. In this step, the initialization server 131 may set a femto cell identifier, address information, etc. of the femto cell 111 and send them to the femto cell 111.

After the initial setting of the femto cell 111, the serving gateway 151 is connected with the femto cell 111 at step 213. The femto cell 111 may have a gateway identifier previously stored as a default setting. In this case, after the initial setting, the femto cell 111 may establish a connection with the serving gateway 151 corresponding to the previously stored gateway identifier.

Next, the serving gateway 151 checks the load condition according to its operation performance and then transmits the load condition to the femto cell 111 at step 215. Specifically, the serving gateway 151 determines its own load condition, depending on, for example, the efficiency of its own hardware, the number of all femto cells 111 connected thereto, the number of user terminals (not shown) accessed to such femto cells 111, a communication environment between the femto cell 111 and the serving gateway 151, a communication environment between the serving gateway 151 and the core network (not shown), and so forth.

In this step, the serving gateway 151 may repeatedly send such load condition to the femto cell 111 at regular intervals. Also, when the operation performance of the serving gateway 151 drops under a given threshold, the serving gateway 151 may detect an overload and performs transmission of the load condition. If the serving gateway 151 is connected with two or more femto cells 111, the serving gateway 151 may selectively transmit the load condition to at least one femto cell 111 which is selected arbitrarily or by rule. It is noted that whenever transmitting the load condition, the serving gateway 151 may send the load condition to the same femto cell 111 or different femto cells 111.

After receiving the load condition from the serving gateway 151, the femto cell 111 transmits the load condition of the serving gateway 151 to the initialization server 131 at step 217.

The initialization server 131 receives the load condition of the serving gateway 151 from the femto cell 111 and then determines whether there is a need for a redirection of the femto cell 111 at step 219. Similarly, the initialization server 131 may also receive the load condition of at least one target gateway 161.

Specifically, the initialization server 131 may determine whether an overload occurs in the serving gateway 151, depending on the load condition of the serving gateway 151. Alternatively, the initialization server 131 may determine whether a relative overload occurs in the serving gateway 151 by comparing the load condition of the serving gateway 151 with that of at least one target gateway 161 which is located within a given distance from the serving gateway 151.

If it is determined that a redirection of the femto cell 111 is needed due to an overload of the serving gateway 151, the initialization server 131 may select a specific one of candidate target gateways 161. Here, the initialization server 131 may calculate respective distances of the candidate target gateways 161 from the femto cell 111 by using a femto cell identifier and address information, and then select a specific target gateway 161 according to such distances.

Next, the initialization server 131 transmits instructions of a redirection to the femto cell 111 at step 221. Here, the redirection instructions may include information on the specific target gateway 161 which is selected as a target of a redirection instead of the serving gateway 151.

The femto cell 111 receives the redirection instructions and transmits a response to the redirection instructions to the initialization server 131 at step 223. Here, the femto cell 111 may notify a safe reception of the redirection instructions to the initialization server 131.

Furthermore, the femto cell 111 transmits a request for a redirection to the target gateway 161 at step 225. In this step, the femto cell 111 may inquire whether the target gateway 161 is connectable, namely, whether the target gateway 161 approves a redirection. Also, the femto cell 111 may send, to the target gateway 161, a femto cell identifier, address information, authentication information, manufacturer information, etc. of the femto cell 111 itself, and user identifiers, authentication information, context information, etc. of the user terminals (not shown) registered in the femto cell 111.

The target gateway 161 receives the redirection request from the femto cell 111 and transmits a response to the redirection request to the femto cell 111 at step 227. Here, the target gateway 161 may notify a safe reception of the redirection request to the femto cell 111. Also, the target gateway 161 may notify approval for a redirection after determining whether it may be connectable with the femto cell 111.

Finally, the femto cell 111 receives the redirection response from the target gateway 161 and performs a redirection from the serving gateway 151 to the target gateway 161 at step 229. That is, the femto cell 111 releases a connection from the serving gateway 151 and instead establishes a connection with the target gateway 161. Here, the femto cell 111 may perform a redirection only if receiving approval for redirection from the target gateway 161.

Figure 3:
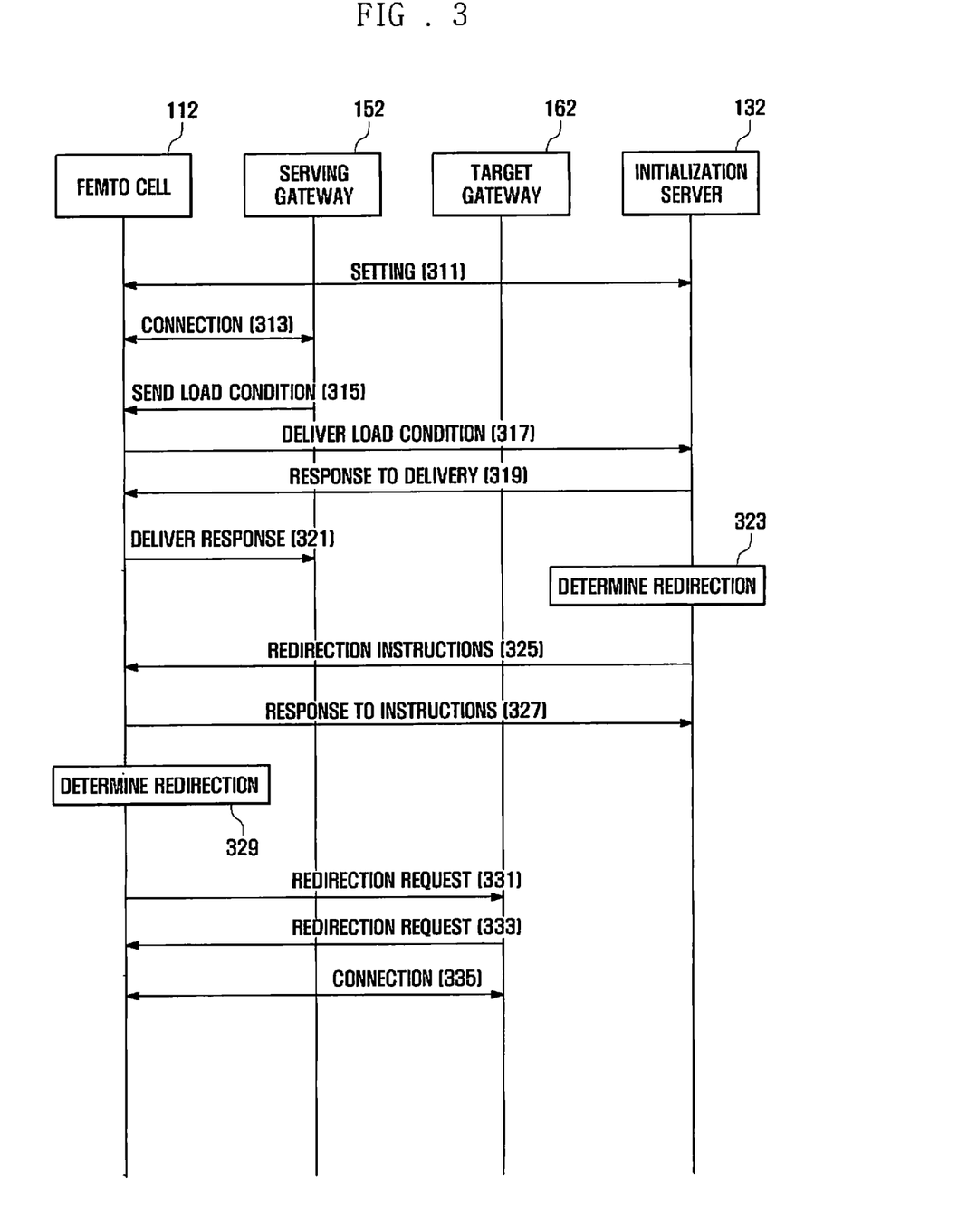
FIG. 3 is a flow diagram which illustrates a redirection method of a femto cell in accordance with a second embodiment of the present invention.

Discussed above is a case where the initialization server 131 decides on a redirection and the femto cell 111 obeys a decision of the initialization server 131, but the present invention is not limited to this case. Although the initialization server decides on a redirection, the femto cell may determine again whether there is a need for a redirection. FIG. 3 shows such a case.

Second Embodiment of Redirection Method of Femto Cell

FIG. 3 is a flow diagram which illustrates a redirection method of a femto cell in accordance with the second embodiment of the present invention. Here, a femto cell 112 is a specific one of the aforementioned femto cells 110, and an initialization server 132 corresponds to the aforementioned initialization server 130. In addition, a serving gateway 152 and a target gateway 162 are specific ones of the aforementioned femto gateways 150.

Referring to FIG. 3, the redirection method of the femto cell 112 in this embodiment begins with an initial setting of the femto cell 112 through the initialization server 132 at step 311. In this step, the initialization server 132 may set a femto cell identifier, address information, etc. of the femto cell 112 and send them to the femto cell 112.

After the initial setting of the femto cell 112, the serving gateway 152 is connected with the femto cell 112 at step 313. The femto cell 112 may have a gateway identifier previously stored as a default setting. In this case, after the initial setting, the femto cell 112 may establish a connection with the serving gateway 152 corresponding to the previously stored gateway identifier.

Next, the serving gateway 152 checks the load condition according to its operation performance and then transmits the load condition to the femto cell 112 at step 315.

After receiving the load condition from the serving gateway 152, the femto cell 112 transmits the load condition of the serving gateway 152 to the initialization server 132 at step 317.

The initialization server 132 receives the load condition from the femto cell 112 and transmits a notification for reception of the load condition to the femto cell 112 at step 319. Here, the initialization server 132 may notify a safe reception of the load condition of the serving gateway 152.

Then the femto cell 112 receives the notification for reception of the load condition from the initialization server 132 and delivers the reception notification to the serving gateway 152 at step 321.

Next, the initialization server 132 determines whether there is a need for a redirection of the femto cell 112 at step 323. Similarly, the initialization server 132 may also obtain the load condition of at least one target gateway 162. In this step, the initialization server 132 may determine whether an overload occurs in the serving gateway 152, depending on the load condition of the serving gateway 152. Alternatively, the initialization server 132 may determine whether a relative overload occurs in the serving gateway 152 by comparing the load condition of the serving gateway 152 with that of at least one target gateway 162.

If it is determined that a redirection of the femto cell 112 is needed due to an overload of the serving gateway 152, the initialization server 132 transmits instructions of a redirection to the femto cell 112 at step 325.

The femto cell 112 receives the redirection instructions and transmits a response to the redirection instructions to the initialization server 132 at step 327. Here, the femto cell 112 may notify a safe reception of the redirection instructions to the initialization server 132.

Furthermore, the femto cell 112 determines whether there is a need for a redirection at step 329. At this time, the femto cell 112 may select one of the serving gateway 152 and the target gateways 162 by comparing the serving gateway 152 and the target gateways 162 registered in the gateway list of initial setting information. Here, the femto cell 112 may calculate respective distances of the candidate target gateways 162 from the femto cell 112 by using address information and then select a specific target gateway 162 according to such distances. Alternatively, the femto cell 112 may select a specific target gateway 162, depending on stability of operation performance.

Next, the femto cell 112 transmits a request for a redirection to the selected target gateway 162 at step 331. In this step, the femto cell 112 may inquire whether the target gateway 162 is connectable, namely, whether the target gateway 162 approves a redirection. Also, the femto cell 112 may send, to the target gateway 162, a femto cell identifier, address information, authentication information, manufacturer information, etc. of the femto cell 112 itself, and user identifiers, authentication information, context information, etc. of the user terminals (not shown) registered in the femto cell 112.

The target gateway 162 receives the redirection request from the femto cell 112 and transmits a response to the redirection request to the femto cell 112 at step 333. Here, the target gateway 162 may notify a safe reception of the redirection request to the femto cell 112. Also, the target gateway 162 may notify approval for a redirection after determining whether to be connectable with the femto cell 112.

Finally, the femto cell 112 receives the redirection response from the target gateway 162 and performs a redirection from the serving gateway 152 to the target gateway 162 at step 335. That is, the femto cell 112 releases a connection from the serving gateway 152 and instead establishes a connection with the target gateway 162. Here, the femto cell 112 may perform a redirection only if receiving approval for redirection from the target gateway 162.

On the other hand, although described above is a case where the initialization server 132 decides on a redirection at step 323 after transmitting a notification for reception of the load condition to the femto cell 112 at step 319, the present invention is not limited to the above case. It is also possible for the initialization server to decide on a redirection before sending such a reception notification.

Figure 4:
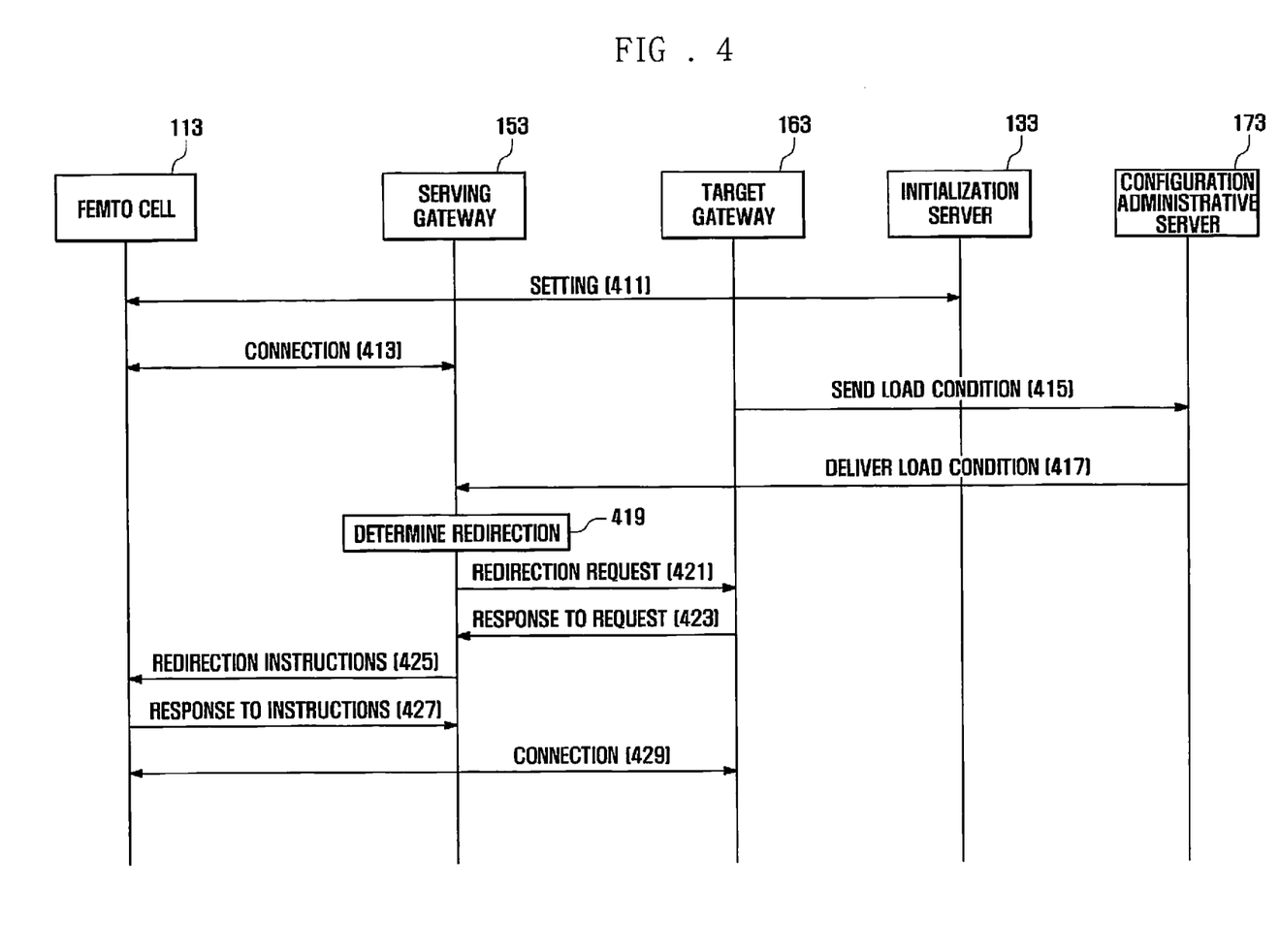
FIG. 4 is a flow diagram which illustrates a redirection method of a femto cell in accordance with a third embodiment of the present invention.

In addition, discussed heretofore are cases where a need for a redirection of the femto cell is determined by a separate server such as the initialization server, but the present invention is not limited to the above cases. Alternatively, the serving gateway instead of a separate server may determine whether there is a need for a redirection. FIG. 4 shows such a case.

Third Embodiment of Redirection Method of Femto Cell

FIG. 4 is a flow diagram which illustrates a redirection method of a femto cell in accordance with the third embodiment of the present invention. Here, a femto cell 113 is a specific one of the aforementioned femto cells 110. Also, an initialization server 133 and a configuration administrative server 173 correspond to the aforementioned initialization server 130 and configuration administrative server 170, respectively. In addition, a serving gateway 153 and a target gateway 163 are specific ones of the aforementioned femto gateways 150.

Referring to FIG. 4, the redirection method of the femto cell 113 in this embodiment begins with an initial setting of the femto cell 113 through the initialization server 133 at step 411. In this step, the initialization server 133 may set a femto cell identifier, address information, etc. of the femto cell 113 and send them to the femto cell 113.

After the initial setting of the femto cell 113, the serving gateway 153 is connected with the femto cell 113 at step 413. The femto cell 113 may have a gateway identifier previously stored as a default setting. In this case, after the initial setting, the femto cell 113 may establish a connection with the serving gateway 153 corresponding to the previously stored gateway identifier. The serving gateway 153 may receive and store a femto cell identifier, address information, etc. of the femto cell 113.

Next, the target gateway 163, e.g., another femto gateway adjacent to the serving gateway 153, checks the load condition according to its operation performance and then transmits the load condition to the configuration administrative server 173 at step 415. Specifically, the target gateway 163 determines its own load condition, depending on, for example, the efficiency of its own hardware, the number of all femto cells (not shown) connected thereto, the number of user terminals (not shown) accessed to such femto cells, a communication environment between the femto cell and the target gateway 163, a communication environment between the target gateway 163 and the core network (not shown), and so forth. Here, the target gateway 163 may repeatedly send such load condition to the configuration administrative server 173 at regular intervals.

After receiving the load condition from the target gateway 163, the configuration administrative server 173 delivers the load condition of the target gateway 163 to the serving gateway 153 at step 417. Similarly, the configuration administrative server 173 may also obtain the load condition of the serving gateway 153. Also, the configuration administrative server 173 may repeatedly send such load condition at regular intervals. In addition, when the operation performance of the serving gateway 153 drops under a given threshold, the configuration administrative server 173 may detect an overload of the serving gateway 153 and transmit the load condition of the target gateway 163 to the serving gateway 153.

The serving gateway 153 receives the load condition of the target gateway 163 from the configuration administrative server 173 and determines whether there is a need for a redirection of the femto cell 113 at step 419. If the serving gateway 153 is connected with two or more femto cells 113, the serving gateway 153 may determine whether at least one femto cell 113 selected arbitrarily or by rule has a need for a redirection. Here, the serving gateway 153 may determine whether an overload occurs therein. Alternatively, the serving gateway 153 may determine whether a relative overload occurs therein by comparing its own load condition with the load condition of at least one target gateway 163.

If it is determined that a redirection of the femto cell 113 is needed due to an overload of the serving gateway 153, the serving gateway 153 may select one of the target gateways 163. Here, the serving gateway 153 may calculate respective distances of the candidate target gateways 163 from the femto cell 113 by using a femto cell identifier and address information, and then select a specific target gateway 163 according to such distances. Alternatively, the serving gateway 153 may select a specific target gateway 163, depending on stability of operation performance.

Next, the serving gateway 153 transmits a request for a redirection to the selected target gateway 163 at step 421. In this step, the serving gateway 153 may inquire whether the target gateway 163 is connectable, namely, whether the target gateway 163 approves a redirection. Also, the serving gateway 153 may send, to the target gateway 163, a femto cell identifier, address information, authentication information, manufacturer information, etc. of the femto cell 113 itself, and user identifiers, authentication information, context information, etc. of the user terminals (not shown) registered in the femto cell 113.

The target gateway 163 receives the redirection request from the serving gateway 153 and transmits a response to the redirection request to the serving gateway 153 at step 423. Here, the target gateway 163 may notify a safe reception of the redirection request to the serving gateway 153. Also, the target gateway 163 may notify approval for a redirection after determining whether it may be connectable with the femto cell 113.

Next, the serving gateway 153 transmits instructions of a redirection to the femto cell 113 at step 425. Here, the serving gateway 153 may notify the target gateway 163 for a redirection to the femto cell 113.

The femto cell 113 receives the redirection instructions and transmits a response to the redirection instructions to the serving gateway 153 at step 427. Here, the femto cell 113 may notify a safe reception of the redirection instructions to the serving gateway 153.

Finally, the femto cell 113 performs a redirection from the serving gateway 153 to the target gateway 163 at step 429. That is, the femto cell 113 releases a connection from the serving gateway 153 and instead establishes a connection with the target gateway 163.

Figure 5:
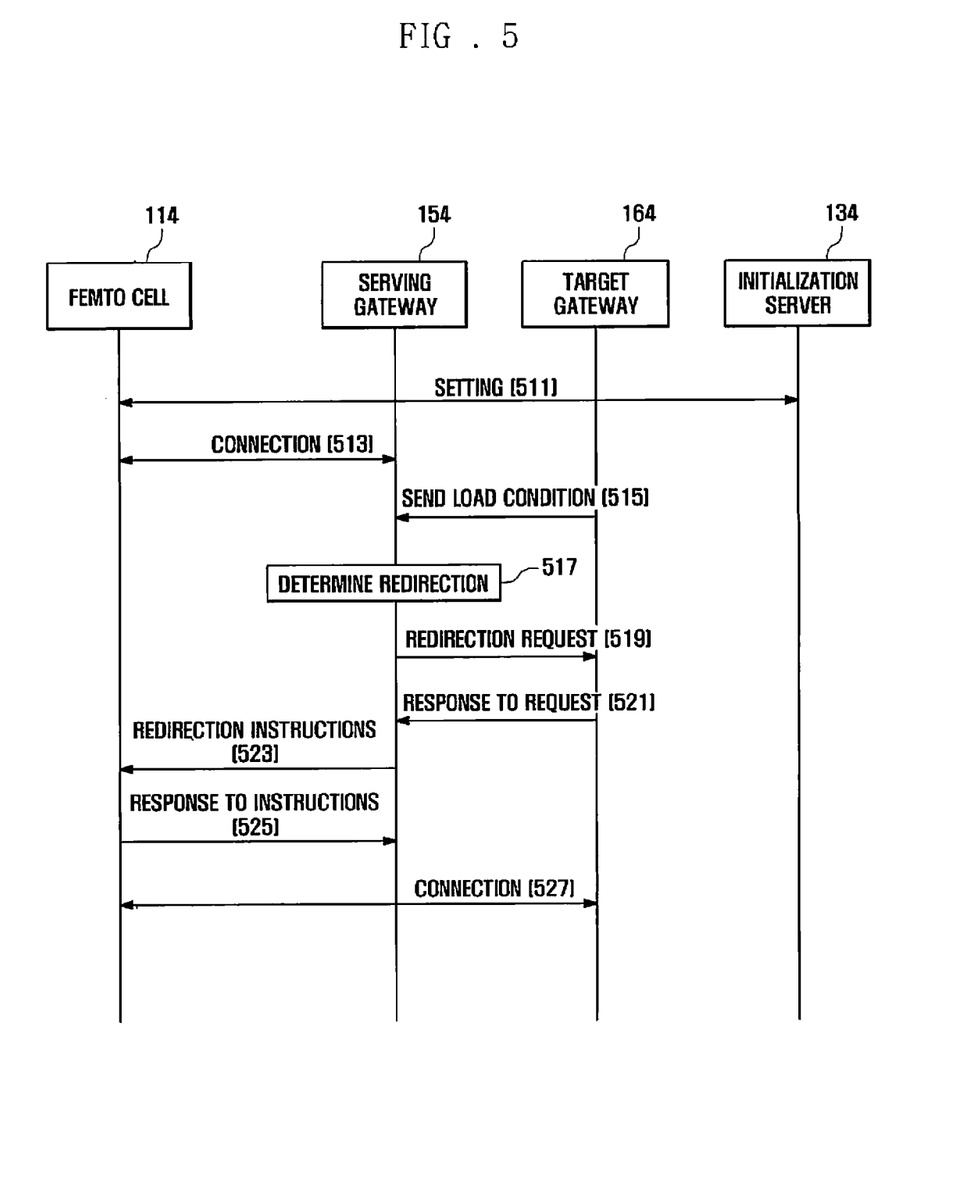
FIG. 5 is a flow diagram which illustrates a redirection method of a femto cell in accordance with a fourth embodiment of the present invention.

Described above is a case where the configuration administrative server 173 gathers the load condition of the target gateway 163 and provides it to the serving gateway 153, but the present invention is not limited to the above case. Alternatively, the target gateway may directly send its own load condition to the serving gateway. FIG. 5 shows such a case.

Fourth Embodiment of Redirection Method of Femto Cell

FIG. 5 is a flow diagram which illustrates a redirection method of a femto cell in accordance with the fourth embodiment of the present invention. Here, a femto cell 114 is a specific one of the aforementioned femto cells 110, and an initialization server 134 corresponds to the aforementioned initialization server 130. In addition, a serving gateway 154 and a target gateway 164 are specific ones of the aforementioned femto gateways 150.

Referring to FIG. 5, the redirection method of the femto cell 114 in this embodiment begins with an initial setting of the femto cell 114 through the initialization server 134 at step 511. In this step, the initialization server 134 may set a femto cell identifier, address information, etc. of the femto cell 114 and send them to the femto cell 114.

After the initial setting of the femto cell 114, the serving gateway 154 is connected with the femto cell 114 at step 513. The femto cell 114 may have a gateway identifier previously stored as a default setting. In this case, after the initial setting, the femto cell 114 may establish a connection with the serving gateway 154 corresponding to the previously stored gateway identifier. The serving gateway 154 may receive and store a femto cell identifier, address information, etc. of the femto cell 114.

Next, the target gateway 164, e.g., another femto gateway adjacent to the serving gateway 154, checks the load condition according to its operation performance and then transmits the load condition to the serving gateway 154 at step 515. Specifically, the target gateway 164 determines its own load condition, depending on, for example, the efficiency of its own hardware, the number of all femto cells (not shown) connected thereto, the number of user terminals (not shown) accessed to such femto cells, a communication environment between the femto cell and the target gateway 164, a communication environment between the target gateway 164 and the core network (not shown), and so forth.

Similarly, the target gateway 164 may also obtain the load condition of the serving gateway 164. Also, the target gateway 164 may repeatedly send such load condition at regular intervals. Additionally, when the operation performance of the serving gateway 154 drops under a given threshold, the target gateway 164 may detect an overload and transmit the load condition to the serving gateway 154.

Next, the serving gateway 154 receives the load condition from the target gateway 164 and then determines whether there is a need for a redirection of the femto cell 114 at step 517. If the serving gateway 154 is connected with two or more femto cells 114, the serving gateway 154 may determine whether at least one femto cell 114 selected arbitrarily or by rule has a need for a redirection.

Additionally, the serving gateway 154 may determine whether an overload occurs therein. Alternatively, the serving gateway 154 may determine whether a relative overload occurs therein by comparing its own load condition with the load condition of at least one target gateway 164. If it is determined that a redirection of the femto cell 114 is needed due to an overload of the serving gateway 154, the serving gateway 154 may select a specific one of candidate target gateways 164. Here, the serving gateway 154 may calculate respective distances of the candidate target gateways 164 from the femto cell 114 by using a femto cell identifier and address information, and then select a specific target gateway 164 according to such distances. Alternatively, the serving gateway 154 may select a specific target gateway 164, depending on stability of operation performance.

Furthermore, the serving gateway 154 transmits a request for a redirection to the target gateway 164 at step 519. In this step, the serving gateway 154 may inquire whether the target gateway 164 is connectable, namely, whether the target gateway 164 approves a redirection. Also, the serving gateway 154 may send, to the target gateway 164, a femto cell identifier, address information, authentication information, manufacturer information, etc. of the femto cell 114, and user identifiers, authentication information, context information, etc. of the user terminals (not shown) registered in the femto cell 114.

The target gateway 164 receives the redirection request from the serving gateway 154 and transmits a response to the redirection request to the serving gateway 154 at step 521. Here, the target gateway 164 may notify a safe reception of the redirection request. Also, the target gateway 164 may notify approval for a redirection after determining whether may be connectable with the femto cell 114.

Next, the serving gateway 154 transmits instructions of a redirection to the femto cell 114 at step 523. Here, the redirection instructions may include information on the specific target gateway 164 which is selected as a target of a redirection instead of the serving gateway 154.

The femto cell 114 receives the redirection instructions and transmits a response to the redirection instructions to the serving gateway 154 at step 525. Here, the femto cell 114 may notify a safe reception of the redirection instructions.

Finally, the femto cell 114 performs a redirection from the serving gateway 154 to the target gateway 164 at step 527. That is, the femto cell 114 releases a connection from the serving gateway 154 and instead establishes a connection with the target gateway 164.

As fully discussed above, when an overload occurs in a certain femto gateway, the femto cell is redirected from the overloaded femto gateway to another femto gateway. It is therefore possible for the femto cell to continuously provide a communication service to user terminals. Also, this communication system may improve and enhance a load balance between the femto gateways, the operation performance of the femto gateways, and service efficiency.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A redirection method of a server in a communication system based on a femto base station, the method comprising:
identifying a femto base station identifier of the femto base station;
receiving a load condition information of a serving gateway from the femto base station, the load condition information having been transmitted to the femto base station by the serving gateway;
determining whether to perform a redirection of the femto base station based on both the load condition information and a threshold value;
selecting one of target gateways based on the femto base station identifier; and
transmitting a message including redirection instructions to the selected target gateway,
wherein receiving the load condition information is performed when an operation performance level of the serving gateway drops under the threshold value.

2. The method of claim 1, wherein the redirection is performed from the serving gateway to the selected target gateway based on the message by the femto base station.

3. The method of claim 1, wherein receiving the load condition information is repeated at regular intervals.

4. The method of claim 1, wherein performing the redirection comprises:
at the femto base station, selecting one of the serving gateway and the target gateway by comparing load conditions of the serving gateway and the target gateway; and
performing the redirection when the target gateway is selected.

5. A redirection method of a serving gateway in a communication system based on a femto base station, the method comprising:
identifying a femto base station identifier of the femto base station;
receiving a load condition information of a target gateway from a server, the load condition information having been transmitted to the server by the target gateway;
determining whether to perform a redirection of the femto base station based on both the load condition information and a threshold value;
selecting one of target gateways based on the femto base station identifier;
transmitting a redirection request to the target gateway; and
transmitting a message including redirection instructions to the femto base station in response to receiving a redirection response from the selected target gateway,
wherein receiving the load condition information is performed when an operation performance level of the serving gateway drops under the threshold value.

6. The method of claim 5, wherein the redirection is performed from the serving gateway to the target gateway based on the message by the femto base station.

7. The method of claim 5, wherein receiving the load condition information is repeated at regular intervals.

8. The method of claim 5, further comprising:
receiving, at the server, the load condition information from the target gateway and delivering the load condition information to the serving gateway.

9. A server for redirecting a femto base station in a communication system, the server comprising:
a transceiver for transmitting and receiving a signal from at least one node located on the communication system; and
a controller for identifying a femto base station identifier of the femto base station, for receiving a load condition information of a serving gateway from the femto base station, the load condition information having been transmitted to the femto base station by the serving gateway, for determining whether to perform a redirection of the femto base station based on both the load condition information and a threshold value, for selecting one of target gateways based on the femto base station identifier, and for transmitting a message including redirection instructions to the selected target gateway,
wherein the controller receives the load condition information when an operation performance level of the serving gateway drops under the threshold value.

10. The server of claim 9, wherein the redirection is performed from the serving gateway to the selected target gateway based on the message by the femto base station.

11. The server of claim 9, wherein the controller receives the load condition information repeatedly at regular intervals.

12. A serving gateway for redirecting a femto base station in a communication system, the serving gateway comprising:
a transceiver for transmitting and receiving a signal from at least one node located on the communication system; and
a controller for identifying a femto base station identifier of the femto base station, for receiving a load condition information of a target gateway from a server, the load condition information having been transmitted to the server by the target gateway, for determining whether to perform a redirection of the femto base station based on both the load condition information and a threshold value, for selecting one of target gateways based on the femto base station identifier, for transmitting a redirection request to the selected target gateway, and for transmitting a message including redirection instructions to femto base station station a response to receiving a redirection response from the selected target gateway, wherein the controller receives the load condition information when an operation performance level of the serving gateway drops under the threshold value.

13. The serving gateway of claim 12, wherein redirection is performed from the serving gateway to the target gateway based on the message by the femto base station.

14. The serving gateway of claim 12, wherein the controller receives the load condition information repeatedly at regular intervals.

* * * * *